S. HILLER.
METHOD OF SEPARATING FRUIT PITS AND THEIR KERNELS.
APPLICATION FILED SEPT. 4, 1919.
1,374,657.
Patented Apr. 12, 1921.
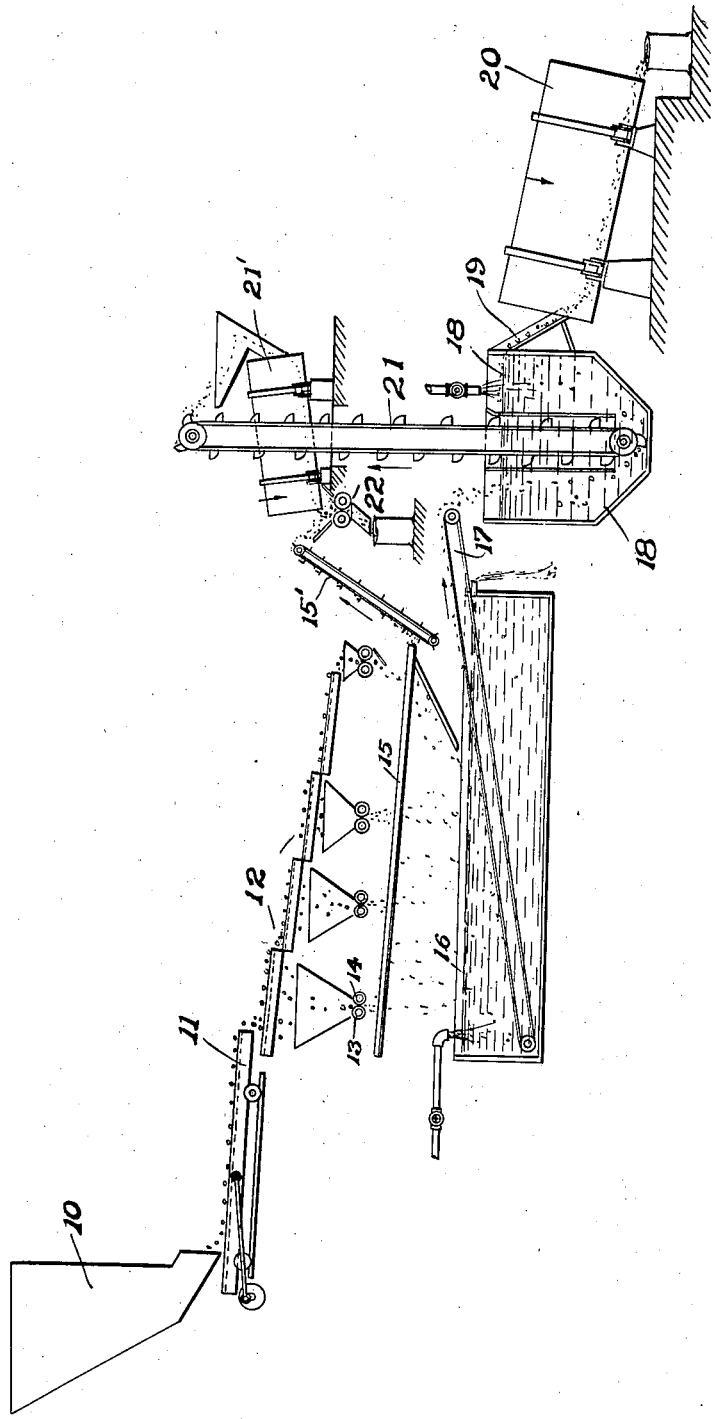
INVENTOR
Stanley Hiller.
BY Strong & Townsend
ATTORNEYS

UNITED STATES PATENT OFFICE.

STANLEY HILLER, OF SAN FRANCISCO, CALIFORNIA.

METHOD OF SEPARATING FRUIT-PITS AND THEIR KERNELS.

1,374,657.   Specification of Letters Patent.   Patented Apr. 12, 1921.

Application filed September 4, 1919. Serial No. 321,554.

*To all whom it may concern:*

Be it known that I, STANLEY HILLER, a citizen of the United States, residing at the city and county of San Francisco and State of California, have invented new and useful Improvements in Methods of Separating Fruit-Pits and Their Kernels, of which the following is a specification.

The present invention relates to a method of separating the shells of fruit pits from their kernels.

In producing products from the kernels of fruit pits it is desirable to commercially separate the shells and kernels and it is the principal object of the present invention to provide simple means whereby the shells and kernels of fruit pits may be continuously and effectually separated.

The present invention contemplates the use of means of cracking pits to liberate the kernels therefrom, thereafter subjecting the shells and kernels to a fresh water bath, and then grading them in brine, continuously drawing off the shells from the top of the brine and kernels from the bottom of the tank.

The invention is illustrated, by way of example in the accompanying drawings, in which the figure shows a diagrammatical arrangement of a plant for producing flour from fruit pits and recovering the kernels of the pits.

In carrying out the present invention, it is desirable to provide a feed hopper 10, into which fruit pits or other shells of like character may be delivered and from which they may pass to a vibrating screen 11; while upon this screen the foreign matter is separated from the pits and they are then caused to pass onto a plurality of grading screens 12 where they are graded into four sizes. The pits may then be delivered to separate sets of cracking rollers 13 and 14. These rollers are arranged in pans set predetermined distances from each other beneath the different graders so that the size of pits delivered thereto will be accommodated and the shell of the pit cracked without crushing the kernels. The crushed pits are then passed to a grader 15, where the large pieces of shells are removed and carried upwardly on an elevator 15'. This means that approximately 75% of the pit is carried away while the remaining 25% must be delivered with the kernel to a water-vat 16. This vat is filled with fresh water. Attention is directed to the fact that in the case of peach pits, it has been impossible to satisfactorily separate the pits from these kernels in a brine solution and one of the important steps of the present invention is to first place the pits in a vat of fresh water, after which they may be carried by an elevator 17 to a brine vat 18. When the shells and kernels have been first soaked in fresh water and then delivered to the brine vat, a certain separating action will be obtained, the kernels floating and the shells sinking. This action is apparently due to the fact that the fresh water does not have the penetrating qualities of the brine, and thus forms a thin film over the outer surface of the shells, so that when the shells are subsequently placed in the brine, they will be more buoyant than would otherwise have been the case. The kernels may be carried off from the top of the vat to the delivery hopper 19 to a suitable drier 20, while the shells which have accumulated in the bottom of the vat 18 may be elevated by conveyer 21, and after passing through a drier 21', then delivered to flouring roller 22, with the large shells carried by elevator 15'. A first flouring operation will reduce the shells to a flour of thirty mesh or over. This flour may be used to advantage in the manufacture of composition flouring. Other portions of the flour may be reduced to 100 mesh or over and can be very readily used in the manufacture of nitroglycerin products. It has been necessary to use considerable wheat flour in connection with this industry and it has been found that by substituting the flour made from peach pits a desirable result will be obtained without producing an appreciable difference in the product made. The absorption qualities of the nitroglycerin are as good or better than when the wheat flour has been used and tests have proven that explosives made with the peach pit flour are very accurate.

It will thus be seen that by utilizing peach pits in the manufacture of flour and by providing a commercially practical way of separating the cracked shells from their kernels, a desirable product may be produced, which product admirably answers the requirements of manufacturers of composition flouring, the powder manufacturers and other allied industries.

While I have shown one method of carrying out the present invention, it will be understood that the arrangement of the apparatus might be varied to obtain the same results without departing from the spirit of the invention as claimed.

Having thus described my invention, what I claim and desire to secure by Letters Patent is—

1. A process of separating the kernels and shells of fruit pits and the like, which consists in placing the cracked shells with the kernels in fresh water and thereafter placing the shells and kernels in brine whereby a complete gravity separation of the shells and kernels will be produced.

2. A process of separating the shells and kernels of fruit pits and the like in a brine solution, one step of which consists in immersing the shells and kernels of the pits within fresh water prior to being placed in a brine tank.

In testimony whereof I have hereunto set my hand in the presence of two subscribing witnesses.

STANLEY HILLER.

Witnesses:
W. W. HEALEY,
M. E. EWING.